United States Patent
Miyoshi

(12) 
(10) Patent No.: US 6,378,059 B1
(45) Date of Patent: Apr. 23, 2002

(54) VIRTUAL STORAGE FOR DYNAMICALLY CHANGING A SIZE OF A VIRTUAL PAGE

(75) Inventor: Kazuto Miyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/536,151

(22) Filed: Mar. 28, 2000

(30) Foreign Application Priority Data

Mar. 29, 1999 (JP) .......................................... 11-085053

(51) Int. Cl.[7] .............................................. G06F 12/00
(52) U.S. Cl. ...................................... 711/203; 711/206
(58) Field of Search .............................. 711/203, 205, 711/206, 207, 208, 209, 170, 172; 714/67

(56) References Cited

U.S. PATENT DOCUMENTS

| | | | | |
|---|---|---|---|---|
| 5,058,003 A | * | 10/1991 | White ......................... | 711/209 |
| 5,375,214 A | * | 12/1994 | Mirza et al. ................. | 711/207 |
| 5,475,827 A | * | 12/1995 | Lee et al. .................... | 711/207 |
| 5,560,013 A | * | 9/1996 | Scalzi et al. .................... | 717/5 |
| 5,699,539 A | * | 12/1997 | Garber et al. ................. | 711/2 |
| 5,752,275 A | * | 5/1998 | Hammond ................... | 711/207 |
| 5,784,699 A | * | 7/1998 | McMahon et al. .......... | 711/171 |
| 5,802,341 A | * | 9/1998 | Kline et al. ................. | 711/209 |
| 6,012,132 A | * | 1/2000 | Yamada et al. ............. | 711/207 |
| 6,038,639 A | * | 3/2000 | O'Brien et al. ............. | 711/114 |
| 6,073,226 A | * | 6/2000 | Cutshall et al. ............. | 711/203 |
| 6,088,780 A | * | 7/2000 | Yamada et al. ............. | 711/206 |

* cited by examiner

Primary Examiner—Hong Kim
(74) Attorney, Agent, or Firm—Sughrue Mion, PLLC

(57) ABSTRACT

A virtual storage unit, virtual storage method and storage medium are provided which are capable of preventing, by incorporating variable length pages, occurrence of faults at a time of execution of a user program and of improving a program execution speed, thus executing the user program efficiently. When a virtual address referenced to by the user program does not exist in a TLB (Translation Look-aside Buffer), a TLB absence page detecting program is activated. The TLB absence page detecting program activates a TLB absence page replacing program. The TLB absence page replacing program activates a page placement referencing program. Page information corresponding to the virtual address referenced by the user program is taken by the page placement referencing program from the page placement storing program and is stored in the TLB. This allows the user program to make a reference to the above virtual address. The user program, if necessary, instructs a page dividing program and a page binding program to divide and bind the page.

8 Claims, 7 Drawing Sheets

FIG.3

| | | physical address 0x1000 | physical address 0x2000 | ... | physical address 0x20000 | physical address 0x20000 | physical address 0x20000 | physical address 0x20000 |
|---|---|---|---|---|---|---|---|---|
| | | size information 1 | size information 1 | | size information 4 | size information 4 | size information 4 | size information 4 |

0x11000  0x12000  ...  0x40000  0x41000  0x42000  0x43000

| 12 | 13 | 14 | 15 | 16 | 17 | 18 | 19 |
|---|---|---|---|---|---|---|---|
| physical address | physical address | physical address | physical address | physical address | physical address | physical address | physical address |
| 1000 | 1000 | 1000 | 1000 | 1004 | 1005 | 1006 | 1006 |
| 4 | 4 | 4 | 4 | 1 | 1 | 2 | 2 |

FIG.4

VIRTUAL STORAGE FOR DYNAMICALLY CHANGING A SIZE OF A VIRTUAL PAGE

BACKGROUND OF THE INVENTION

1. Field of the Invention

The present invention relates to a virtual storage unit, virtual storage method and storage medium and more particularly to the virtual storage unit, virtual storage method and storage medium which are capable of preventing occurrence of faults and improving a program execution speed by introducing a variable length page.

2. Description of the Related Art

A virtual storage system is conventionally used in such a manner that a storage unit controlled by an operating system is protected from improper reference thereto by a user program and/or that, by replacing data of the storage unit with data of a secondary storage unit, it appears that a memory capacity of the storage unit being usable by the user program would increase in a virtual manner.

The size of a page of the conventional virtual storage system is fixed in units of 4K (kilo) bytes or 8K bytes and, only in the fixed area within the operating system, predetermined numbers of variable pages can be referenced by occupying a TLB (Translation Look-aside Buffer) entry.

The fixed area is used for an inputting and outputting device, a communication buffer and a management area of a high use frequency.

However, the conventional virtual storage method has the following problems.

A first problem is that, as the user program becomes larger, a probability of occurrence of faults becomes higher. The reason is that, in general, when the user program having an area being larger than a storage area represented by a formula, [(number of TLB entries)×(size of page)], is executed, replacement of the TLB entries occurs, causing degraded performance of the operating system.

A second problem is that, if a variable-length page in the fixed area can be referenced at all times, some of the TLB entries are always used in a fixed manner, thus causing decreased numbers of the TLB that can be assigned freely, resulting in the same degraded performance of the operating system as in the case of the first problem.

A third problem is that, if the size of the page is increased uniformly, at a time of a fault of the storage unit, all large pages must be replaced with other storage factors, causing longer time required for the replacement of copies of contents of the storage unit or a like and additional replacement of even normal portions and thus causing decreased efficiency in use.

SUMMARY OF THE INVENTION

In view of the above, it is an object of the present invention to provide a virtual storage unit, virtual storage method and storage medium which are capable of preventing occurrence of faults at a time of execution of a user program and of improving a program execution speed, thus executing the user program efficiently.

According to a first aspect of the present invention, there is provided a virtual storage unit for dynamically changing a size of a virtual page displaced on virtual space including;

a first storing means for storing a physical address on a head page of a variable length physical page corresponding to the virtual page and size information showing a size of the variable length physical page;

a retrieving means for retrieving the variable length physical page containing a physical address corresponding to a predetermined virtual address from the virtual address;

a calculating means for calculating a virtual address on a head page of a virtual page corresponding to the variable length physical page from a physical address on a head page of the variable length physical page retrieved by the retrieving means and size information showing a size of the variable length physical page;

a second storing means for storing a virtual address on a head page of the virtual page corresponding to the variable length physical page calculated by the calculating means; and whereby the size of each of the variable length physical pages is set to the size of an exponential multiple of a specified basic page size of two.

In the foregoing, the preferable mode is one wherein the retrieving means, based on a value obtained by dividing the virtual address by the basic page size, retrieves the variable length physical page corresponding to the virtual address from the first storing means and obtains the physical address on the head page of the variable length physical page and size information showing the size of the variable length physical page.

Also, the preferable mode is one wherein the calculating means, when the virtual address is contained in the virtual page, by dropping a remainder obtained by dividing the virtual address by the size of the variable length physical page, calculates the virtual address on the head page of the virtual page.

Also, the preferable mode is one that wherein comprises dividing means for dividing the variable length physical page corresponding to the predetermined virtual address.

Also, the preferable mode is one that wherein comprises binding means for binding the variable length physical page corresponding to the predetermined virtual address.

Furthermore, the preferable mode is one that wherein comprises a page binding means for binding the variable length physical page corresponding to the predetermined virtual address and a history recording means for recording the history of operations of binding by the page binding means, whereby the page binding means binds the variable length physical page based on the history recorded in the history recording means.

According to a second aspect of the present invention, there is provided a method of virtual storage for dynamically changing the size of the virtual page displaced on virtual space including;

a first storing step of storing the physical address on a head page of a variable length physical page corresponding to the virtual page and size information showing the size of a variable length physical page;

a retrieving step of retrieving the variable length physical page containing a physical address corresponding to a predetermined virtual address from the virtual address;

a calculating step of calculating a virtual address on a head page of the virtual page corresponding to the variable length physical page from the physical address on the head page of the variable length physical page retrieved by the retrieving step and size information showing the size of the variable length physical page;

a second storing step of storing the virtual address on the head page of the virtual page corresponding to the variable length physical page calculated by the calculating step; and whereby the size of each of the variable length physical pages is set to the size of an exponential multiple of a specified basic page size of two.

According to a third aspect of the present invention, there is provided a storage medium storing the program being able to execute the method for virtual storage stated in the preceding.

BRIEF DESCRIPTION OF THE DRAWINGS

The above and other objects, advantages and features of the present invention will be more apparent from the following description taken in conjunction with the accompanying drawings in which:

FIG. 3 is an example of a page table stored in a page placement storing section of the virtual storing unit according to the first embodiment;

FIG. 4 is another example of the page table stored in the page placement storing section of the virtual storing unit according to the first embodiment;

DETAILED DESCRIPTION OF THE PREFERRED EMBODIMENTS

Best modes of carrying out the present invention will be described in further detail using various embodiments with reference to the accompanying drawings.

First Embodiment

Figure 1:
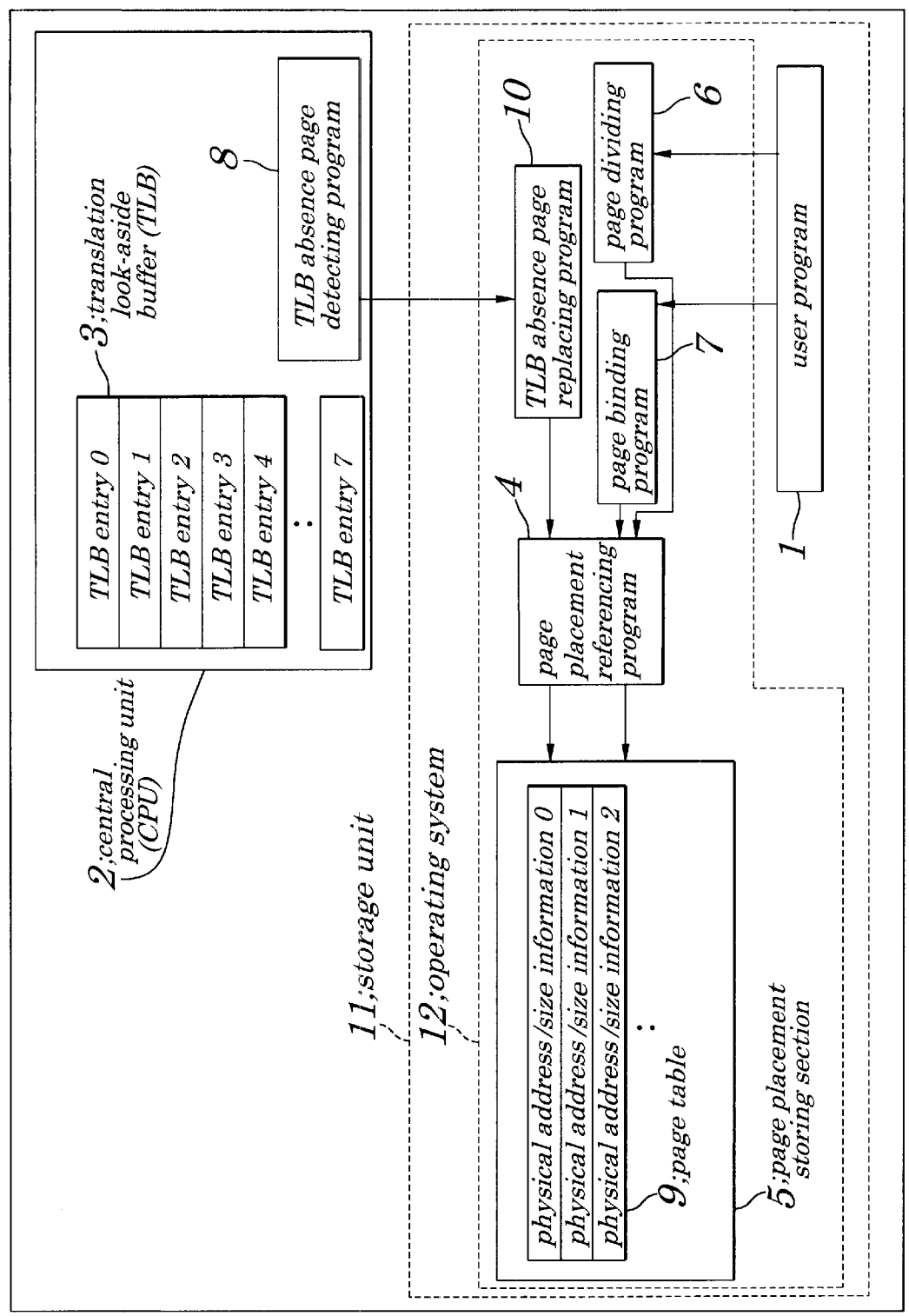
FIG. 1 is a schematic block diagram showing a virtual storage unit according to a first embodiment of the present invention.

FIG. 1 is a schematic block diagram showing a virtual storage unit according to an embodiment of the present invention. As shown in FIG. 1, the virtual storage unit is comprised of a central processing unit (CPU) 2 and a storage unit 11, and the CPU 2 contains a translation look-aside buffer (TLB) 3, a TLB absence page detecting program 8, an arithmetic unit (not shown) and a register (not shown). The TLB 3 is so configured that a virtual address, a physical address and size information showing a size of a page (hereafter, called a page size) are stored therein. The TLB 3 plays a role in converting the virtual address designated (or accessed) by users to any physical address. A purpose of the above conversion is to provide virtual space for every process and to protect the virtual space.

Since all TLB 3 entries are in an empty state at a time of activation regardless of the page size, if a predetermined virtual address is accessed (or read or written), the TLB 3 absence is first detected and then page information corresponding to the virtual address is retrieved, resulting in the replacement of the TLB 3 and then in a normal access, thus filling or replacing the entry gradually.

The storage unit 11 is composed of a RAM (Random Access Memory) or a like (not shown) and is so configured that a user program 1 is executed by control of an operating system 12.

The operating system 12 is comprised, in terms of software, of a page placement referencing program 4, a TLB absence page replacing program 10, a page dividing program 6 for changing placement of the physical address, a page binding program 7, a page placement storing section 5 for storing page information and the user program 1 that is arbitrarily created by the user, and virtual storage unit is implemented by page information (containing the physical address and the page size) stored in a page table 9 of the page placement storing section 5.

The page placement storing section 5 has the page table 9 in which the page information containing the physical address and the size of the page is described. The TLB absence page detecting program 8 is adapted to be activated by the central processing unit 2 when the user program 1 makes a reference to the virtual address not existing in the TLB 3 and to operate in cooperation with the TLB absence replacing program 10.

The TLB absence page replacing program 10 is so configured as to activate the page placement referencing program 4 in order to take page information corresponding to the virtual address accessed by the user program 1 from the page placement storing section 5 and to store the page information in the TLB 3.

The user program 1, though it operates in accordance with codes described by the user, is so configured as to repair a failure of the storage unit 11 in the middle of operations or to instruct the page dividing program 6 to divide the page in order to improve either of amounts of using the storage unit 11 or program execution speeds or to instruct the page binding program to bind the page.

The page having an arbitrary size used for supporting the central processing unit 2 is an object for replacement to the TLB 3 and the size of the page is subject to dynamic change depending on states of its use, failure or a like. The central processing unit 2 is adapted to support a smallest page called a "basic page" and the page having a size of an exponential multiple of two.

The page placement storing section 5 is used to store the physical address on the head page of the variable physical page corresponding to each virtual page placed on virtual space and the size information (page size information) showing the size of the page now being used. Hereinafter, both the physical address on the head page and the size information together are called "page information".

At this point, in order to simplify a calculation of the virtual address on the head page using the virtual address (address on the virtual space) at the time of faults, the page information is created and stored in such a manner that both the physical address on the head page and the virtual address are an integral multiple of the size of the variable page to be assigned.

If the user program 1 makes a reference to the virtual address not existing in the TLB 3 of the central processing unit 3, the TLB absence page replacing program 10 of the operating system 12 is activated and the virtual address is transferred to the page placement referencing program 4.

The page placement referring program 4 by using a value obtained by dividing the given virtual address by a size of the basic page as a subscript, retrieves the page placement storing section 5 and calculates a head virtual address and head physical address of the page to be targeted. The calculated page information is stored in the TLB 3 of the central processing unit 2, thus allowing the user program 1 to make a reference to the virtual address.

When the user program 1 divides the page and changes the placement of the physical memory, an instruction for dividing is provided to the page dividing program 6. The page dividing program 6 is adapted to separate the variable physical page corresponding to the virtual address designated by the user program and again to store the changed page information in the page placement storing section 5.

Similarly, when a plurality of pages is bound in accordance with the user program 1, an instruction for binding is provided to the page binding program. The page binding program 7 contains the physical address corresponding to the virtual address designated by the user program 1, which is operative to calculate the largest variable length physical page being within a size limitation on the central processing unit 2 and then to bind the pages, and the page information changed by the binding is again stored in the page placement storing section 5.

This allows the storage unit 11 to be referenced by using the variable length page and the page size to be changed freely depending upon the use state of the storage unit 11.

Figure 2:
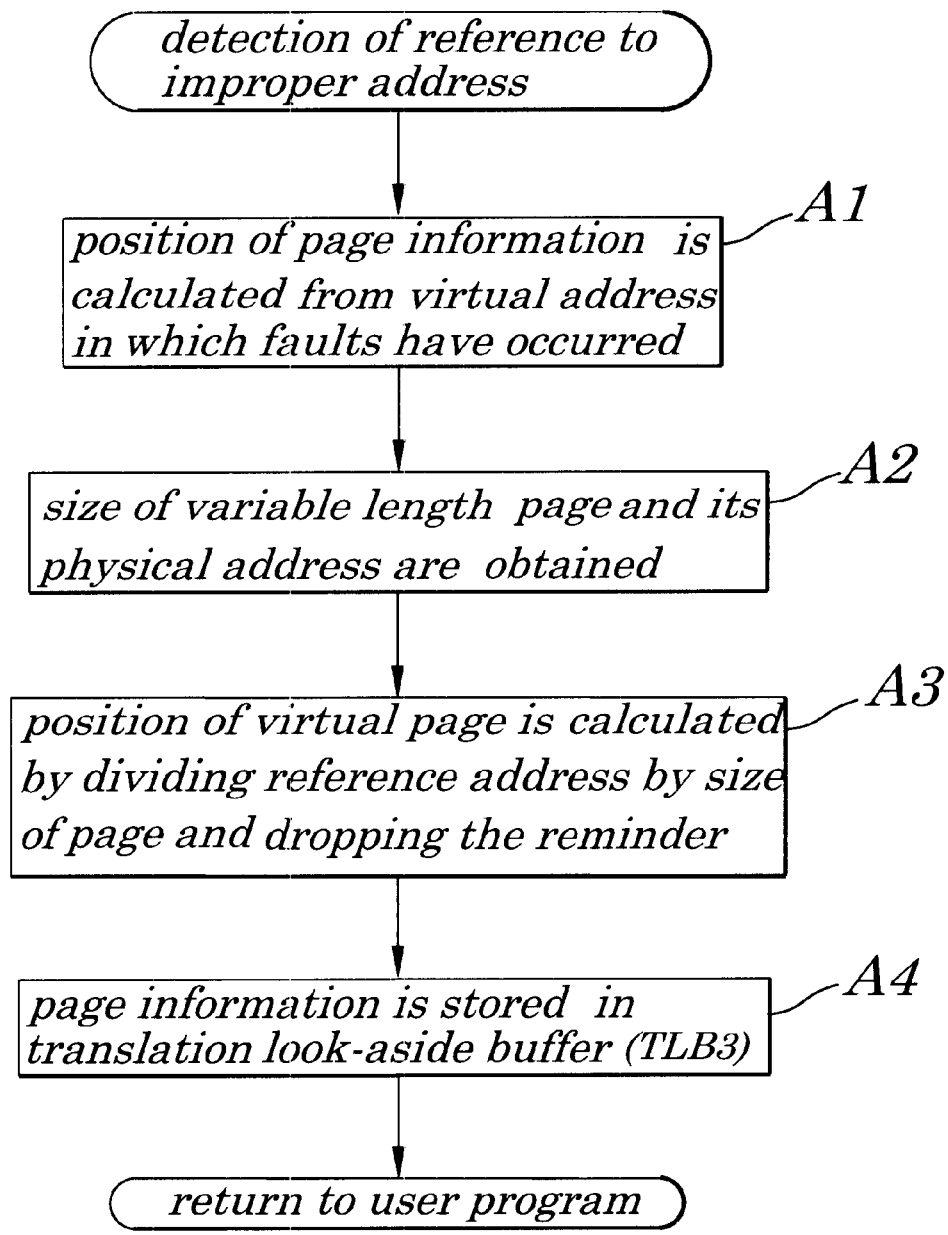
FIG. 2 is a flowchart explaining operations of the virtual storage unit of FIG. 1.

Operations of the virtual storage unit will be further described by referring to a flowchart in FIGS. 2 to 4. Here, let it be assumed that the user program 1 has made improper access to an address not existing in the TLB 3 of the central processing unit 2 (for example, an address in virtual space such as 0×40003000 or a like. 0×40003000 represents a value obtained by expressing 40003000 in hexadecimal.). FIGS. 3 and 4 show examples of page tables 9 stored in the page placement storing section 5.

The table page 9 stored in the page placement storing section 5 of the embodiment includes head page physical addresses of the variable length physical address corresponding to each virtual page displaced in the virtual space and the size information.

At this point, both the physical address and the virtual address on the head page are stored in the page placement storing section 5, which are set to be the integral multiple of the size of the variable length page to be assigned so that the virtual address on the head page (head virtual address) may be easily calculated from the virtual address in which faults have occurred.

For example, if the variable length physical pages composed of basic physical pages 1000, 1001, 1002 and 1003 are assigned to logical page numbers 12, 13, 14 and 15, "1000" is set, as the head physical page address, to four storing sections corresponding to the logical page numbers 12, 13, 14 and 15 at the page placement storing section 5 and "4" is set as page size information. The basic size, i.e., "1" may be assigned as the variable length physical page. In this case, however, unlike in the case of this embodiment, the placement information is stored in the page placement storing section 5.

Now, if the virtual address not existing in the TLB 3 of the central processing unit 2 is referenced to by the user program 1, the page placement referencing program 4 of the operating system 12 is activated and the referenced virtual address is transferred to the page placement referencing program at Step A1 in FIG. 2.

The page placement referencing program 4, by using, as a subscript (0×40003), a value (0×40003) obtained by dividing a given address (for example, 0×40003000) by the basic page size (for example, 0×1000), is adapted to retrieve the page placement storing section 5 and to get necessary page information.

Next, at Step A2, the size of the variable length page, for example, page size being 0×1000 (in the case of 4k byte page), page size being 0×4000 (in the case of 16k byte page) and its head physical address, for example, 0×200000 are obtained from the page information gotten at Step A1.

Then, at Step A3, the head virtual address (0×40000000) is calculated by judging whether the virtual address (0×40003000) is contained or not in the variable length page area (16k byte page starting from 0×40000000) and, when the virtual address is judged to be contained in the variable length area (0×40000000 or 0×400003fff), by dividing the given virtual address (0×40003000) by the size of the variable length page (0×4000) and by dropping the remainder (0×3000).

At Step A4, the calculated head virtual address (0×40000000), head physical address (0×20000) and size of the page (0×4000) are stored in the TLB 3 of the central processing unit 2. As a result, this allows the user program 1 to make a reference to the virtual address (0×40003000).

Figure 5:
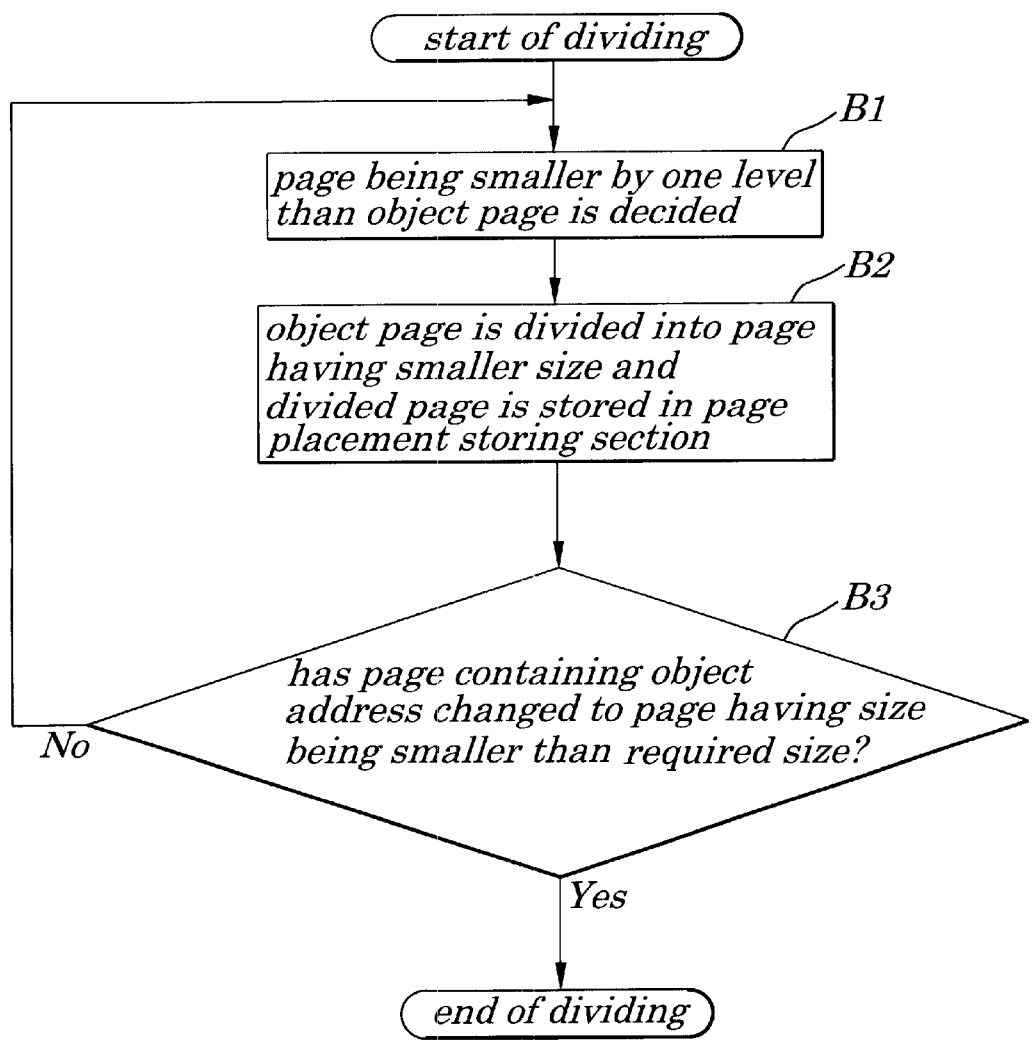
FIG. 5 is a flowchart explaining procedures for page dividing applied to the virtual storage unit according to the first embodiment.

Next, operations for making a page smaller containing a specified address will be described by referring to a flowchart in FIG. 5. First, the user program 1 instructs the page dividing program 6 to make the size of the page containing the specified address smaller than the predetermined size.

The page dividing program 6 that has received this instruction is adapted to calculate the page PG containing a designated address and its size P0 by using the page placement referencing program 4. The page size of the page P1 being smaller by one level than the size of the page P0 is obtained.

Next, at Step B2, the size of the page PG is divided into the page having the size of P1 and the page information changed by the operation is stored in the page placement storing section 5 by using the page placement referencing program 4.

At Step B3, whether the page containing the object address has changed to the page having a size being smaller than the required page size or not is judged and, when the page containing the object address is judged not to have changed to the page having the size being smaller than the required page size, the operation returns back to Step B1 and the processing following Step B1 is then performed repeatedly. The processing is terminated when the page containing the object address is judged to have changed to the page having the size being smaller than the required page size. Thus, processing including Steps B1 to B3 is executed repeatedly until the page containing the object address is changed to the page having the size being smaller than the required page size.

For example, let it be assumed that, when the variable length pages including the basic page numbers 1000 to 1007 are assigned to the logical page numbers 12 to 19, the user program 1 instructs the page dividing program 6 to restore the virtual page number 16 to its basic page.

At this point, the page dividing program 6, as shown in FIG. 4, is adapted to store the head physical page address "1000" and the page size information "4" in each of four storing sections corresponding to the logical page numbers 12, 13, 14 and 15 of the page placement storing section 5.

Moreover, four storing sections corresponding to the logical page numbers 16, 17, 18 and 19 are again divided. The head physical page address 1004 and its page size information "1" are stored in the storing section corresponding to the logical page number 16 while the head page address 1005 and its page size information "1" are stored in the storing section corresponding to the logical page number 17. The physical head page address 1006 and its page size information "2" are stored, respectively, in the storing sections corresponding to the logical page numbers 18 and 19.

Figure 6:
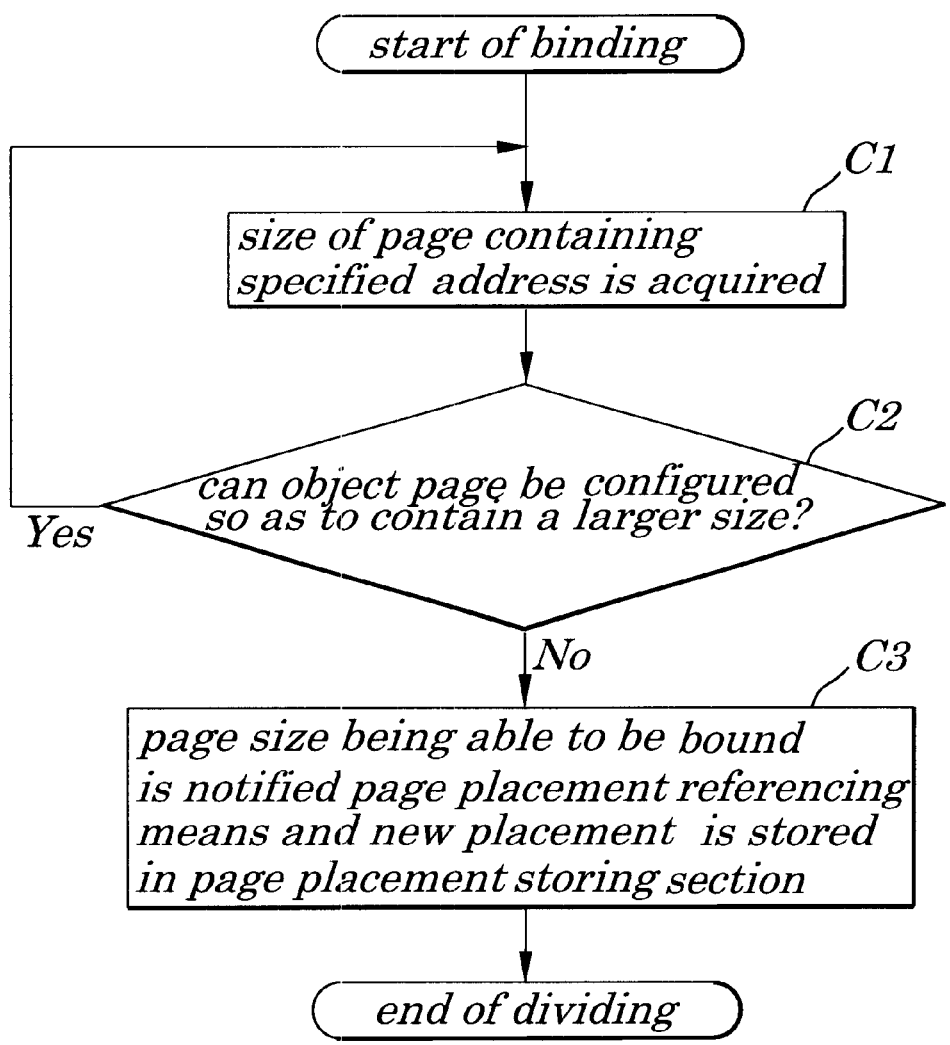
FIG. 6 is a flowchart explaining procedures for page binding applied to the virtual storage unit according to the first embodiment.

Next, as shown in FIG. 6, a case where a size of a page containing a specified address is made larger by binding a plurality of pages together will be described. The user program 1 instructs the page binding program 7 to make the size of the page containing the specified address larger by one level.

The page binding program 7 having received the above instruction is adapted to acquire the page PG containing the specified address and its page size P0 at Step C1 in FIG. 6.

At Step C2, whether the object page can be bound to have a size being larger by one level than that of the object page or not is determined by using the page placement referencing program 4 and, if the object page is judged to be able to be bound to have the size being larger by one level than that of the object page, operations return back to Step C1 and the processing following the Step C1 is performed repeatedly. On the other hand, if the object page is judged to be unable to be bound to have a larger size, operations go to Step C3.

The processing at Steps C1 and C2 is performed repeatedly until the object page cannot be bound to have a larger size and, at Step C3, variable length physical page is created and the page information changed by the operation is again stored in the page placement storing section 5.

As described above, according to this embodiment, by introducing the variable length page, the storage area to which the user program 1 can make the reference larger without causing occurrence of faults, thus increasing an execution speed of the user program.

Moreover, according to this embodiment, by locally rewriting contents of the page placement storing section 5, re-division or re-binding of the page is made possible, in which copy or a like of the content of the page is not required. This allows changes to the variable length page to be stopped even during operations of the operating system and the relationship between the virtual address and storage unit 11 to be changed and further pages having the basic size to be bound together to increase the execution speed.

Second Embodiment

Figure 7:
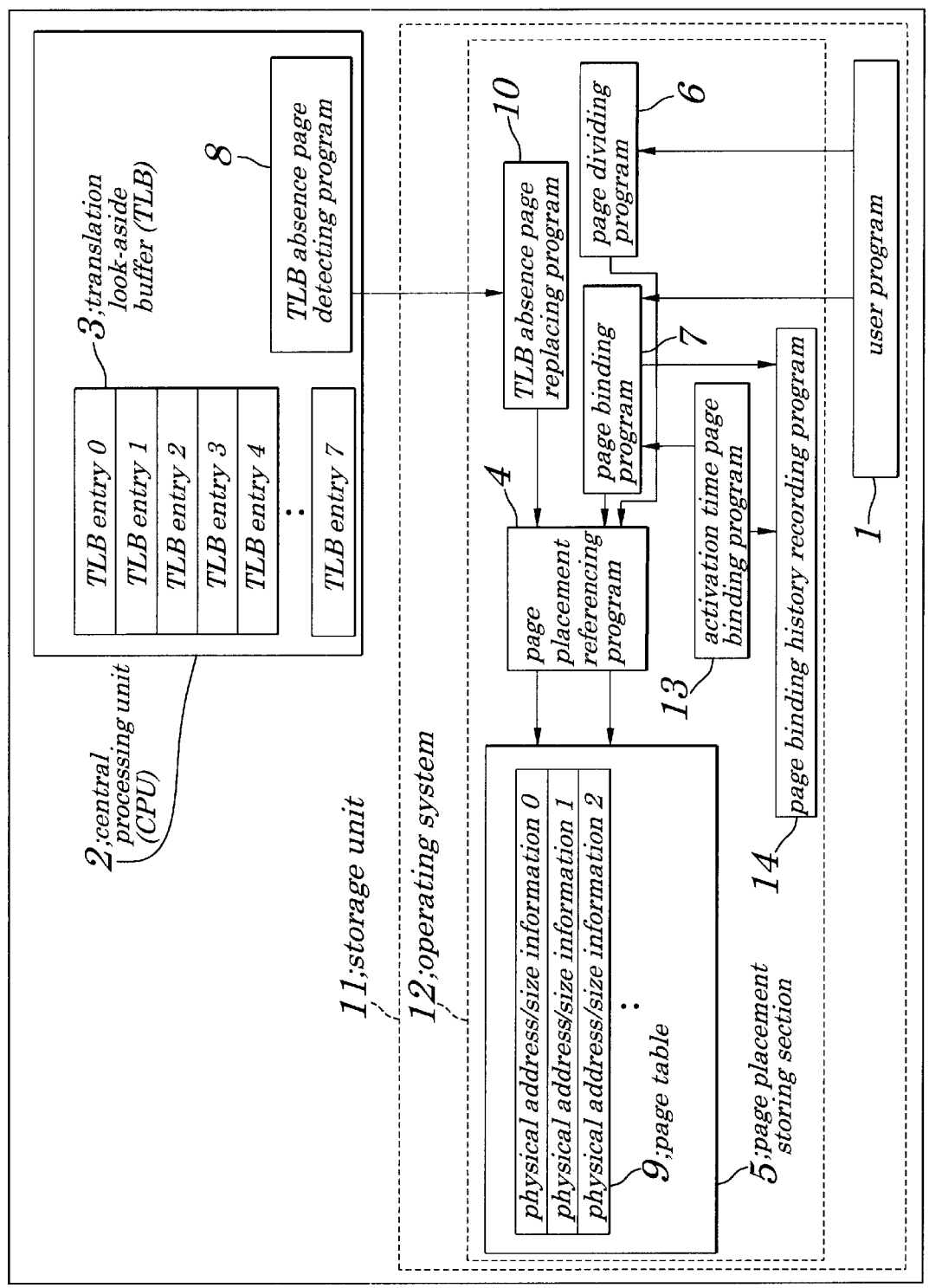
FIG. 7 is a schematic block diagram showing a virtual storage unit according to a second embodiment of the present invention.

FIG. 7 is a schematic block diagram showing a virtual storage unit according to a second embodiment of the present invention. As shown in FIG. 7, configurations of the second embodiment differ from those of the first embodiment in that the virtual storage unit is provided with an activation time page binding program 13 and a page binding history recording program 14 within the operating system 12.

The page binding history recording program 14 is operative in cooperation with the page binding program 7 and is used to store page binding operations during the time period from the start of the activation of the operating system to its re-starting. That is, every time the page binding is instructed, the virtual address in which the page has been bound is stored one by one. It is not necessary to store all histories of binding operations and the history information within a range permissible by the capacity of the storage unit 11 may be stored.

The activation time page binding program 13 is adapted to make a reference to the page binding history recording program 14 at the time of starting the operating system 12 and to obtain a list showing states of the page binding that has been carried out at the previous operations. Then, the page binding is again carried out in accordance with the obtained list showing states of the page information.

In general, the page placement storing section 5 in the storage unit 11 is initialized at the time of re-starting the operating system 12. Therefore, according to this embodiment, by making a reference to the page binding history recording program 14 at the time of starting the operating system, by obtaining the list showing states of the page binding that has been carried out previously if it exists and by again performing the page binding in accordance with the obtained list, the page binding from its first stage is not required at the time of starting the operating system second time and thereafter, thus reducing time required for the page binding.

Thus, in the virtual storage unit, virtual storage method and storage medium of the present invention, by storing the physical address on the head page of the variable length physical page corresponding to the virtual page and the size information showing the size of the variable length physical page, by retrieving the variable length physical page containing the physical address corresponding to the virtual address from the predetermined virtual address, by calculating the virtual address on the head page of the virtual page corresponding to the variable length physical page from the physical address on the head page of the retrieved variable length physical page and the size information showing the size of the variable length physical page, by storing the virtual address on the head page of the virtual page corresponding to the calculated variable length physical page, the physical address on the head page of the variable length physical page and the size information showing the size of the variable length physical page and by setting the size of the variable length page to be an arbitrary size of an exponential multiple of a specified basic size of two, the size of the variable length physical page can be dynamically changed, occurrence of faults at the time of execution of the user program can be prevented and the user program can be executed effectively.

It is apparent that the present invention is not limited to the above embodiments but may be changed and modified without departing from the scope and spirit of the invention. For example, in the above embodiments, the case is described where program for performing the page binding at the time of starting the operating system 12 is introduced, however, during operations of the operating system, it may monitor a rate of using the page and may perform the page binding and page dividing in the same manner as the user program 1 does.

Moreover, for example, the virtual storage unit may be so configured that, when the referenced virtual address does not exist in the TLB 3 and when the page corresponding to the above virtual address does not exist in the main storage on the page table 9, a request for calling the page may be made to a disk (not shown) from which the page can be read into the storage unit 11. If the disk is used as a storing area (saved-area) of the main storage unit (i.e., storage unit 11 in the example), necessary data is read from the disk at almost the same time as the TLB 3 is re-written.

Furthermore, in the virtual storage unit of the above embodiments, hardware or a like may be replaced for all or part of software.

Finally, the present application claims the priority of Japanese Patent Application No. Hei11-085053 filed on Mar. 29, 1999, which is herein incorporated by reference.

What is claimed is:

1. A virtual storage unit for dynamically changing a size of a virtual page displaced on virtual space comprising;

a first storing means for storing a physical address on a head page of a variable length physical page corresponding to the virtual page and size information showing a size of the variable length physical page;

a retrieving means for retrieving the variable length physical page containing a physical address corresponding to a predetermined virtual address from the virtual address;

a calculating means for calculating a virtual address on a head page of the virtual page corresponding to the variable length physical page from the physical address on the head page of the variable length physical page retrieved by said retrieving means and size information showing the size of the variable length physical page;

a second storing means for storing the virtual address on the head page of the virtual page corresponding to the variable length physical page calculated by said calculating means; and whereby the size of each of the variable length physical pages is set to the size of an exponential multiple of a specified basic page size of two.

2. The virtual storage unit according to claim 1, wherein said retrieving means, based on a value obtained by dividing the virtual address by the basic page size, retrieves the variable length physical page corresponding to the virtual address from said first storing means and obtains a physical address on the head page of the variable length physical page and size information showing the size of the variable length physical page.

3. The virtual storage unit according to claim 1, wherein said calculating means, when the virtual address is contained in the virtual page, by dropping a remainder obtained by dividing the virtual address by the size of the variable length physical page, calculates the virtual address on the head page of the virtual page.

4. The virtual storage unit according to claim 1, further comprising a dividing means for dividing the variable length physical page corresponding to the predetermined virtual address.

5. The virtual storage unit according to claim 1, further comprising a binding means for binding the variable length physical page corresponding to the predetermined virtual address.

6. The virtual storage unit according to claim 1, further comprising a page binding means for binding the variable length physical page corresponding to the predetermined virtual address and a history recording means for recording a history of operations of binding by said page binding means, whereby said page binding means binds the variable length physical page based on the history recorded in said history recording means.

7. A method of virtual storage for dynamically changing, a size of a virtual page displaced on virtual space comprising;

a first storing step of storing a physical address on a head page of a variable length physical page corresponding to the virtual page and size information showing a size of the variable length physical page;

a retrieving step of retrieving the variable length physical page containing a physical address corresponding to a predetermined virtual address from the virtual address;

a calculating step of calculating a virtual address on a head page of the virtual page corresponding to the variable length physical page from the physical address on the head page of the variable length physical page retrieved by the retrieving step and size information showing the size of the variable length physical page;

a second storing step of storing the virtual address on the head page of the virtual page corresponding to the variable length physical page calculated by the calculating step; and whereby the size of each of the variable length physical pages is set to the size of an exponential multiple of a specified basic page size of two.

8. The storage medium storing a program being able to execute the method for virtual storage claimed in claim 7.

* * * * *